United States Patent
Domes et al.

(10) Patent No.: US 6,779,298 B1
(45) Date of Patent: Aug. 24, 2004

(54) PERFORATED GERBERA FLOWER CUP

(75) Inventors: Terry Ann Domes, Reno, NV (US); William Joseph Domes, Jr., Reno, NV (US)

(73) Assignee: Lone Wolf Trading Company, LLC, Reno, NV (US)

( * ) Notice: Subject to any disclaimer, the term of this patent is extended or adjusted under 35 U.S.C. 154(b) by 0 days.

(21) Appl. No.: 10/251,684

(22) Filed: Sep. 19, 2002

Related U.S. Application Data

(60) Provisional application No. 60/324,102, filed on Sep. 21, 2001, and provisional application No. 60/331,077, filed on Nov. 6, 2001.

(51) Int. Cl.[7] .............................. A01G 5/00; A47G 7/00
(52) U.S. Cl. ...................... 47/41.01; 47/31.1; 47/41.12; 47/41.15; 206/423; 428/35.2; 428/34.3; 428/23
(58) Field of Search ................................ 428/35.2, 34.3, 428/23; 47/37, 34, 30, 66.1, 41.01, 31, 37.1, 65, 41.12, 41.15, 44, 41, 41.11, 84; 206/423

(56) References Cited

U.S. PATENT DOCUMENTS

| | | | |
|---|---|---|---|
| 1,562,992 A | 11/1925 | Schling | |
| 1,775,203 A | 9/1930 | Krumholz | |
| 1,831,308 A | 11/1931 | Kuck | |
| 1,951,642 A | 3/1934 | Augustin et al. ............... | 42/34 |
| 2,029,043 A | * 1/1936 | Wendell et al. | |
| 2,247,191 A | 6/1941 | Endres ......................... | 229/87 |
| 2,293,531 A | * 8/1942 | Brooks | |
| 2,876,587 A | 3/1959 | Saks et al. ...................... | 47/41 |
| 3,104,498 A | 9/1963 | Miller ............................ | 47/34 |
| 3,131,510 A | 5/1964 | Engstrom ...................... | 47/41 |
| 3,297,289 A | 1/1967 | Raus ........................... | 248/152 |
| 3,481,075 A | * 12/1969 | Dastoli et al. | |
| 3,556,389 A | 1/1971 | Gregoire ....................... | 229/53 |
| 3,767,104 A | 10/1973 | Bachman et al. ........... | 229/7 R |
| 3,830,015 A | 8/1974 | Belgiorno ...................... | 47/32 |
| 3,928,936 A | 12/1975 | Wollen .......................... | 47/41 |
| 4,016,678 A | * 4/1977 | Larsen ......................... | 47/77 |
| 4,203,180 A | * 5/1980 | Striplin ......................... | 24/17 |
| 4,224,763 A | 9/1980 | Prindle ...................... | 47/41.11 |
| 4,250,664 A | * 2/1981 | Remke ......................... | 47/76 |
| 4,887,385 A | * 12/1989 | James et al. ............... | 47/41.12 |
| 5,040,330 A | 8/1991 | Belgiorno ...................... | 47/73 |
| 5,279,072 A | 1/1994 | Garbo ....................... | 47/41.14 |
| 5,347,752 A | 9/1994 | Black ........................ | 47/41.11 |

(List continued on next page.)

FOREIGN PATENT DOCUMENTS

| | | | | |
|---|---|---|---|---|
| GB | 2051536 A | * | 6/1979 | ............ A01G/9/02 |
| GB | 2165143 A | * | 4/1986 | ............ A47G/7/04 |
| GB | 2191692 A | * | 12/1987 | ............ A47G/7/02 |

*Primary Examiner*—Peter M. Poon
*Assistant Examiner*—Andrea M. Valenti
(74) *Attorney, Agent, or Firm*—Barbara J. Luther; Quarles & Brady Streich Lang, LLP

(57) ABSTRACT

A flower cup having a flared bell-like shape has a flared rim, tapered sides and a substantially flat base. The rim, sides and a portion of the base have a plurality of perforations running from the rim to the base, where the perforations meet a plurality of lines which radiate from the center of the base. The plurality of side perforations can be six and the plurality of base lines six. The side perforations align with the base lines. The plurality of base lines are partly perforated and partly cut, or half of the base lines are fully cut and the other half of the base lines are partly cut and partly perforated. The flower cup can have a stippled finish. A flower-stem protector has a straw sized to accommodate flower stems and having at least one rib on its proximal end, and a collar affixed to the proximal end of the straw.

7 Claims, 2 Drawing Sheets

U.S. PATENT DOCUMENTS

| | | | |
|---|---|---|---|
| 5,687,547 A | 11/1997 | Weder | 53/397 |
| 5,765,305 A * | 6/1998 | Shaw | 47/58 |
| 5,906,086 A * | 5/1999 | Weder | 53/412 |
| 6,038,812 A | 3/2000 | Belokin et al. | 47/41.01 |
| 6,354,039 B1 * | 3/2002 | Weder | 47/41.15 |
| 6,393,761 B1 | 5/2002 | Deacon | 47/41.01 |
| 2001/0000273 A1 | 4/2001 | Alcazar et al. | 47/72 |
| 2001/0000555 A1 | 5/2001 | Weder et al. | 47/72 |

\* cited by examiner

PERFORATED GERBERA FLOWER CUP

This application claims the benefit of U.S. Provisional Application No. 60/324,102, filed Sep. 21, 2001, and U.S. Provisional Application No. 60/331,077, filed Nov. 6, 2001.

BACKGROUND

1. Technical Field

The present invention relates generally to the field of shipping and storing devices for blooming flowers, and more particularly to a device for protecting Gerbera flower blooms during shipping and storage.

2. The Prior Art

Gerbera is a genus comprising about 40 species of daisies that are distributed from Africa across to Madagascar into tropical Asia and South America. Through hybridization, a massive array of colors is now available. Having a long vase life, these flowers are widely used in the cut flower industry. The Gerbera daisy usually has a shaft between 12 and 36 inches. The blooms are available in different sizes: normal, mini and jumbo.

The blooms are up to about 12 cm wide and are shipped in full bloom or almost full bloom. Because the gerbera blooms are so large relative to the strength of the stem, the blooms must be protected in transit.

At greenhouses, the Gerbera are cut and prepared for shipment. At a "table" with holes for flower protectors, each flower is inserted into a flower protector. When the Gerberas reach their destination at a florist, the daisies are removed from their protectors and used in flower arrangements. Unfortunately, the daisy petals often cling to the plastic protectors and the blooms and stems are damaged as the protectors are pushed down the stem or torn from the daisy.

SUMMARY OF THE INVENTION

A flower cup has a flared bell-like shape, the cup including a flared rim, tapered sides and a substantially flat base. The rim and sides have a stippled or embossed finish and a plurality of inside-to-outside perforations running from the rim to the base, where the perforations adjoin a plurality of lines which radiate from the center of the base. Optionally, the plurality of side perforations is six and the plurality of base lines is six. The flower cup can have side perforations aligned with the base lines. The plurality of base lines can be partly perforated and partly cut. Half of the base lines can be fully cut and the other half of the base lines can be partly cut and partly perforated. Optionally, the flower cup has a stippled finish. A flower-stem protector has a straw sized to accommodate flower stems and having at least one rib on its proximal end, and a collar affixed to the proximal end of the straw.

BRIEF DESCRIPTION OF THE DRAWING FIGURES

DETAILED DESCRIPTION OF A PREFERRED EMBODIMENT

The inventive flower cup is used to house and protect a Gerbera flower. The cup is made from plastic, preferably polyvinyl chloride. The cup has a stippled finish on the inside of the cup. This finish is also referred to as hammered or dotted. This keeps the flat daisy petals from sticking to the inside of the cup.

Figure 1:
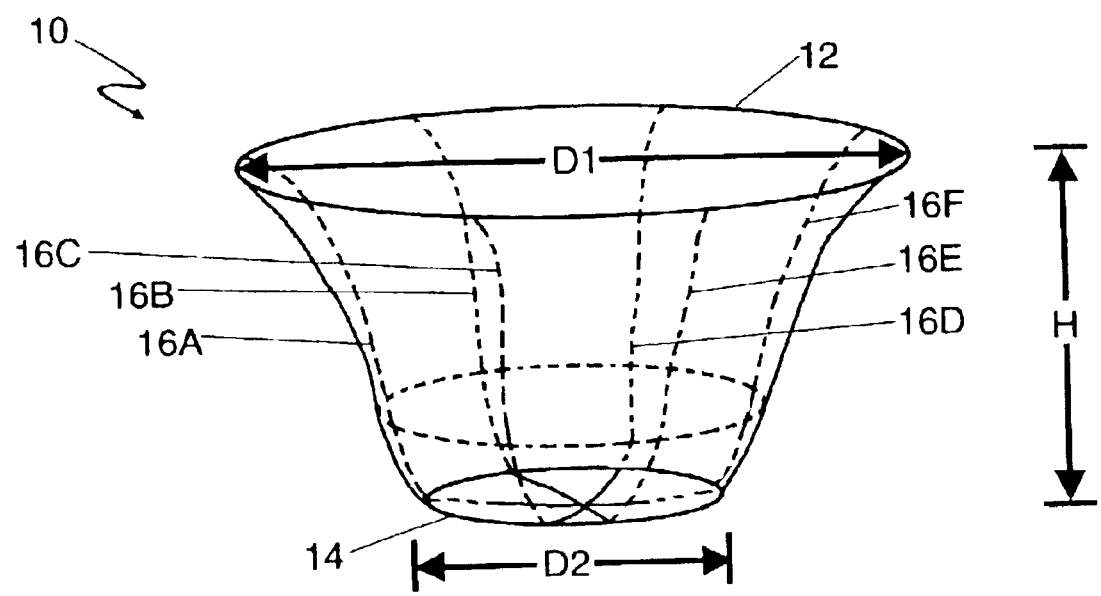
FIG. 1 is a side view of one embodiment of the inventive flower cup.

FIG. 1 shows an embodiment of the inventive flower cup 10. The cup has a flared outer rim 12 at the top. This serves to reduce the angle of contact between the rim 12 of the flower cup 10 and the underside of the daisy petals. This reduces the damage or bruising incurred when inserting a daisy into the flower cup. The less is the contact between the petals of the Gerbera daisy and the rim 12 of the cup, the less the damage to the blossom. The flared rim 12 also helps retain the flower cup 10 in the hole of a flower table, even when the stem is pressed into the flower cup. Without the flared brim 12, the flower cup 10 would slip through the hole in the flower table. The flared outer rim 12 is provided in different diameters D to accommodate the different sizes of the Gerberas. The preferred diameters are 75 mm and 85 mm.

The flower cup's diameter narrows from the flared rim 12 toward the base 14. Thus, the flower cup has a flared bell shape. Flower cups 10 are made in different heights H to accommodate the different sizes of the Gerberas. Preferred heights are 40 mm, 45 mm, 58 mm and 65 mm.

The base 14 of the flower cup 10 is substantially flat, and its diameter D' also varies with the size of Gerbera used. Preferred diameters are 32 mm and 38 mm. There are six perforations 16a–16f from the top rim 12 of the flower cup 10, down the side of the cup, and to the base 14 of the flower cup 10, meeting in a "star cut" in the base 14. The perforations are preferably inside-to-outside, which provides a smooth finish on the inside and minimizes bruising and tearing of flower petals.

Figure 2:
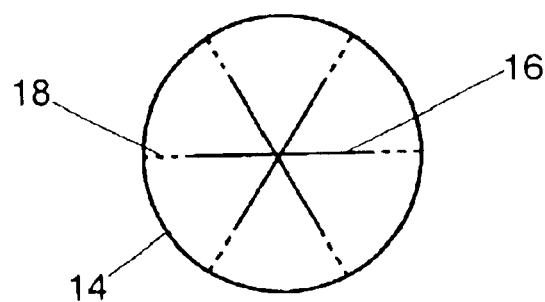
FIG. 2 is a view of the base of one embodiment of the inventive flower cup.

FIG. 2 shows the star cut (or straw hole) in more detail. The star-cut pattern in the base 14 of the flower cup 10 consists of three equal intersecting lines approximately 20 mm in length. The star cut in the base creates six tabs, each with cut sides 16 of approximately 10 mm in length. In some embodiments, the remaining distance from the end of the cut or tab to the outer edge of the base is a perforated line 18. This perforation is either about 6 mm or 9 mm for the 32 mm and 38 mm bases 14, respectively. These dimensions have been chosen to avoid damage to the stem as the daisy is placed in and removed from the flower cup. The tabs are so dimensioned as to provide sufficient pressure on the stem to stay in place.

With the star cut and side perforations, there are two additional ways to remove the cup from the Gerbera. One can start at the top of the cup where the perforation starts and tear down the side toward the bottom and the star cut. Alternately, one can pull separate tabs on the star cut at the bottom and pull up along the side towards the top. Either way, there is little or no contact between the hands and the Gerbera daisy. This reduces bacterial transfer and damage potential.

Figure 3:
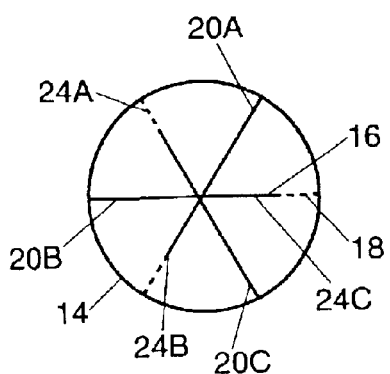
FIG. 3 is another embodiment of the base of the flower cup.

While the star cut in the base 14 of the flower cup is three intersecting lines, not all cut lines need be of equal length. In one embodiment shown in FIG. 3, three alternating lines 20a, 20b and 20c in the base 14 are cut to the outer rim of the base. Thus, in this embodiment, all lines are not partially cut and partially perforated; three lines 20a, 20b and 20c are entirely cut in a line that is one half of the 32 mm or 38 mm base. The three remaining lines 24a, 24b and 24c in the star cut are partly cut 16 and partly perforated 18. Each of lines 24a, 24b and 24c has a central 10 mm cut portion and a lateral perforated portion, which is 6 mm or 9 mm for the 32 mm and 38 mm diameters, respectively. Preferably the full-cut lines 20*a*, 20*b* and 20*c* alternate with the partly cut lines 24*a*, 24*b* and 24*c*.

As the cut portion 16 of the star cuts is shortened, the tabs become more rigid and stiff. This exerts more pressure on the shaft on the Gerbera daisy, helping to keep the flower cup in place and not sliding down the shaft. However, in the removal process, this pressure can cause more damage.

As the cut portion 16 of the star cut pattern is lengthened, the tabs become more flexible and loose. This exerts less pressure on the shaft of the Gerbera daisy, causing less damage in the removal process. The increased flexibility of the tabs makes them easier to tear; however, this increased flexibility can cause the cup to slide slightly down the shaft of the Gerbera, reducing the cup's protection of the blossom petals.

The flower cups are fabricated as follows: A series of 40–50 molds have been made to the specifications of one of the four sizes and have small, outward projections which result in a stippled appearance. These molds are arranged in a pattern to properly accept a sheet of PVC material. The sheet of PVC is passed over the molds. Air pressure and heat are then applied to force the plastic into the molds in a process known as thermoforming. The sheet of PVC is lifted out of the molds and each flower cup is then trimmed or die cut. This separates the molded cups from the excess PVC.

Next the flower cups are perforated from the inside out, so no sharp edges contact the daisies. The star cut pattern cutter is aligned with the side perforations and the star-cut pattern is cut into the base. At this point in the process, the perforations and the star cut are checked to confirm that the perforations more or less line up with the star cut, which assures a smoother tear, either from top to bottom or bottom to top.

Figure 4:
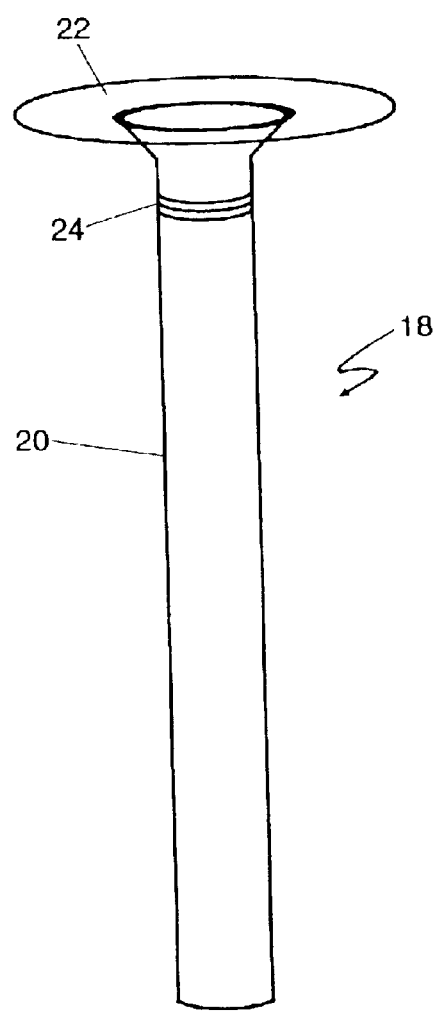
FIG. 4 is a flower stem protector.

FIG. 4 shows a flower-stem protector 18. It has a straw 20 which fits over the stem of the Gerbera and also a collar 22, which sits in the base of a flower cup. The collar 22 is small enough to fit in the base of the flower cup and large enough to be supported by a flower cup base, which has radial slits. The flower-stem protector 18 also has circumferential ribs 24 in the straw. The ribs 24 help keep the straw in place on the flower stem. The flower stem protector is intended for use with Gerberas with particularly large blossoms and/or relatively weak stems. For use with flower cups with base diameters of 32–38 mm, the collar 22 preferably is about 29 mm in diameter. The straw 20 is preferably about 9 cm, but may be as long as 20 cm.

Although the invention has been illustrated and described in detail herein, it is to be understood that various changes and modifications may be made therein without departing from the spirit and scope of the invention as defined in the appended claims.

What is claimed is:

1. A flower cup having a flared bell-like shape, the cup comprising
   a) a smooth, flared rim;
   b) tapered sides; and
   c) a substantially flat base with a star-cut pattern of equal intersecting base lines radiating from the center of the base, creating flexible tabs, with a flexible center capable of adjusting to different diameters of flower stalks;
   the rim and the sides having a plurality of inside-to-outside perforations running from the rim to the perimeter of the base, where the perforations adjoin the equal intersecting base lines of the star-cut pattern.

2. The base flower cup of claim 1 wherein the plurality of side perforations is six and the plurality of base lines is six.

3. The flower cup of claim 1 wherein the equal intersecting base lines are partly perforated and partly cut.

4. The flower cup of claim 1 wherein half of the base lines are fully cut and the other half of the base lines are partly cut and partly perforated.

5. The flower cup of claim 1 wherein the base lines are fully cut.

6. The flower cup of claim 1 wherein the cup has a stippled or embossed finish.

7. A flower cup having a flared bell-like shape, the cup comprising
   a) a smooth, flared rim;
   b) tapered sides;
   c) a substantially flat base with a star-cut pattern of equal intersecting base lines radiating from the center of the base, creating flexible tabs, with a flexible center capable of adjusting to different diameters of flower stalks; and
   d) the rim and the sides having a stippled finish and having a plurality of inside to outside perforations running from the rim to the perimeter of the base, where the perforations adjoin the equal intersecting base lines of the star-cut pattern.

\* \* \* \* \*